United States Patent Office 3,060,217
Patented Oct. 23, 1962

---

3,060,217
THIOPHOSPHORIC ACID ESTERS
Gerhard Schrader, Wuppertal-Cronenberg, Germany, assignor to Farbenfabriken Bayer Aktiengesellschaft, Leverkusen, Germany, a corporation of Germany
No Drawing. Filed Oct. 7, 1958, Ser. No. 765,725
Claims priority, application Germany Oct. 25, 1957
5 Claims. (Cl. 260—461)

The present invention relates to and has as its objects new and useful insecticidal thiophosphoric acid esters which may be represented by the following general formula

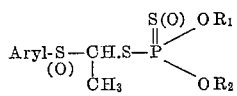

in which aryl stands for a possibly substituted aryl radical and $R_1$ and $R_2$ stand for lower alkyl radicals up to 4 carbon atoms.

In accordance with this invention it has been found that the inventive compounds may be prepared by reacting O.O-dialkyldithio- or monothio-phosphoric acids with arylvinyl ethers or -thioethers. According to Markovniko's rule, these thiophosphoric acids add on vinyl compounds in such a manner that compounds with a branched alkyl chain are formed. This reaction may be shown by the following scheme (in which the symbols have the same significance as shown above):

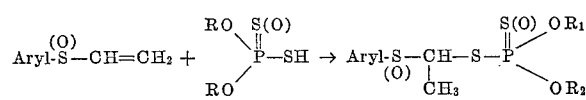

The addition of dialkyl dithio- or -monothiophosphoric acids on vinylaryl ether or vinylaryl thioether may be carried out in the presence of suitable inert solvents. Hydrocarbons such as benzene or toluene, are especially suitable as such solvents.

The addition generally proceeds exothermically. The reaction is advantageously carried out so that the addition proceeds at temperatures of about 50–70° C.

If necessary the reaction may be completed by heating the reaction mixture to the aforesaid temperature for a further period of up to about 2 hours.

The addition of thiophosphoric acids is practically quantitatively so that even the crude products of the resultant new thiono or thionothiolphosphoric acid esters are usually obtained in a very pure state. The new esters generally obtained in the form of water-insoluble oils are useful as pest control agents especially in the field of plant protection.

The new esters are applied in the manner commonly used for other phosphoric acid esters, i.e. preferably in combination with suitable extenders or diluents. As examples there may be mentioned talcum, chalk, or kieselguhr if solid extenders are to be used, or inert organic solvents or water if liquid extenders or diluents are to be used. In the latter case, aqueous emulsifiers are especially suitable. These may be obtained by using a suitable dissolving agent such as acetone or dimethyl formamide, simultaneously employing a commercial emulsifier such as fat alcohol sulfonates, aromatic polyglycol ethers and the like.

Some of the new compounds are already effective at concentrations of 0.0001% of active constituents per unit by weight of an aqueous or liquid dilution for combating insects and similar pests, usually concentrations of 0.01% or 0.1% are sufficient for effective pest control.

As an example for the special utility of the inventive compounds the esters of the following formulae (I) 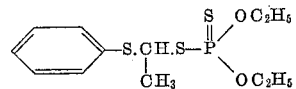

(II) 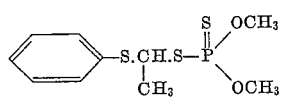

have been tested against aphids and spider mites. Aqueous solutions of the above shown compounds have been prepared by mixing the active ingredient with the same amount of dimethyl formamide as an auxiliary solvent adding thereto 20% by weight referred to active ingredient of a commercial emulsifier consisting of a benzyl hydroxy polyglycol ether containing about 10 to 15 glycol residues, and diluting at last this premixture with water to the desired concentration indicated in the following paragraphs.

The tests have been carried out as follows:

(A) against aphids (contact-insecticidal action) of the type *Doralis fabae*. Heavily infested bean plants (*Vicia faba*) have been sprayed drip wet with solutions as prepared above. The effect has been determined by evaluation after 24 hours by counting the dead pests either on the surface of the soil or still remaining on the plants. The following results have been obtained:

| Compound | Solutions, percent | Killing rate, percent |
|---|---|---|
| I | 0.01 | 100 |
| II | 0.001 | 100 |

(B) against spider mites (contact-insecticidal action). Bean plants (*Phaseolus vulgaris*) of about 15 inches high are sprayed drip wet with solutions prepared as indicated above of a concentration as shown below. The bean plants have been infested heavily with the two-spotted spider (species *Tetranychus telarius*). Evaluation has been carried out after 24 hours, 48 hours and 8 days. The following results have been obtained:

| Compound | Solutions, percent | Killing rate, percent |
|---|---|---|
| I | 0.001 | 100 |
| II | 0.01 | 100 |

The following examples are given for the purpose of illustrating the invention.

*Example 1*

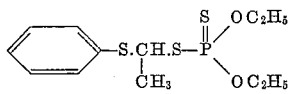

35 grams (0.25 mol) of vinylphenyl thioether (B.P. 55° C./1 mm. Hg) are introduced into a flask provided with a stirrer. 47 g. (0.25 mol) of diethyl dithiophosphoric acid are added with external cooling in such a manner that the reaction temperature does not exceed 60° C. When the reaction is completed, the temperature is maintained at 60° C. for a further 2 hours; the reaction product is then run into water, the oil thus formed is taken up with benzene, washed neutral with a 4 percent sodium bicarbonate solution, dried over sodium sulphate and the solvent is removed by vacuum distillation.

In this way 75 g. of a slightly yellowish water-insoluble oil are obtained which boils at 124° C. under a pressure of 0.01 mm. Hg. Yield 68 g. corresponding to 84 percent of the theoretical.

Aphids are killed completely with solutions of 0.01%. Spider mites are killed completely with solutions of 0.001%. Caterpillars are killed completely with solutions of 0.1%. Toxicity on rats per os LD$_{50}$ 25 mg./kg. Ovicidal action on eggs of the red spider 0.1% positive.

*Example 2*

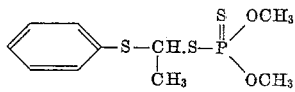

35 g. (0.25 mol) of vinylphenyl thioether are treated while stirring with 40 g. of dimethyl dithiophosphoric acid as described in Example 1. When the reaction is completed, the temperature is maintained at 60° C. for a further 2 hours and working up carried out as described in Example 1. 60 g. of the new ester are obtained in the form of a colourless water-insoluble oil of B.P. 60° C./0.01 mm. Hg. Yield 82 percent of the theoretical.

Aphids are killed completely with solutions of 0.001%. Spider mites are killed completely with solutions of 0.01%. Caterpillars are killer completely with solutions of 0.1%. Toxicity on rats per os LD$_{50}$ 25 mg./kg.

*Example 3*

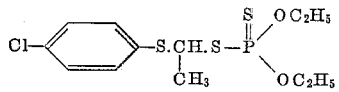

45 g. (0.25 mol) of vinyl-p-chlorophenyl thioether (B.P. 67° C./1 mm. Hg) are slowly treated while stirring with 47 g. of diethyl diethiophosphoric acid in such a manner that the temperature does not rise above 70° C. When the reaction is completed, heating is continued at 60° C. for a further 2 hours and worked up as indicated in Example 1. 75 g. of the new ester are obtained corresponding to 84 percent of the theoretical.

Aphids are killed completely with solutions of 0.01%. Spider mites are killed to 70% with solutions of 0.0001%. Toxicity on rats per os LD$_{50}$ 10 mg./kg. Ovicidal action on eggs of the red spider 0.1% positive.

By the same way but using instead of vinyl-p-chlorophenyl thioether the equimolecular amount of vinyl-3.4-dichlorophenyl ether, there is obtained the ester of the following formula

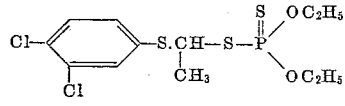

*Example 4*

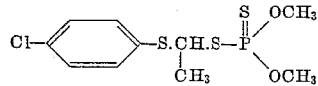

45 g. (0.25 mol) of vinyl-p-chlorophenyl-thioether are treated while stirring with 40 g. of dimethyl-dithio-phosphoric acid in such a manner that the temperature does not rise above 55° C. When the reaction is completed, the mixture is heated at 55° C. for a further 2 hours and the process carried out as indicated in Example 1. 60 g. of the new ester are obtained in the form of a slightly yellowish water-insoluble oil. Yield 74 percent of the theoretical.

Grain weevils are killed completely with solutions of 0.01%. Aphids are killed completely with solutions of 0.01%. Spider mites are killed completely with solutions of 0.01%. Toxicity on rats per os LD$_{50}$ 50 mg./kg. Ovicidal action on eggs of the red spider 0.1% positive.

By the same way but using instead of vinyl-p-chlorophenyl-thioether the equimolecular amount of vinyl-p-bromophenyl-thioether, there is obtained the ester of the following formula

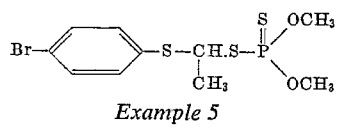

*Example 5*

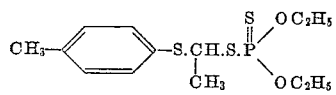

39 g. (0.25 mol) of vinyl-p-methylphenyl thioether (B.P. 63° C./1 mm. Hg) are slowly treated with 47 g. of diethyl dithiophosphoric acid in such a manner that the temperature does not essentially rise above 65° C. When the reaction is completed, the temperature is maintained at 60° C. for a further hour and worked up in conventional manner. 70 g. of the new ester are thus obtained in the form of a slightly yellowish water-insoluble oil. Yield 83 percent of the theoretical.

*Example 6*

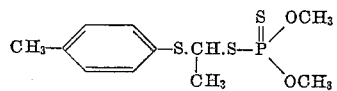

38 g. (0.25 mol) of vinyl-p-methylphenyl thioether are treated while stirring with 40 g. of dimethyl dithiophosphoric acid in such a manner that the temperature does not rise above 55° C. When the reaction is completed, the mixture is kept at this temperature for a further hour. After working up 58 g. of the new ester are obtained in the form of a slightly yellowish water-insoluble oil. Yield 75 percent of the theoretical.

*Example 7*

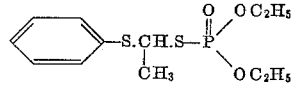

35 g. (0.25 mol) of vinylphenyl thioether are treated while stirring with 43 g. of diethyl monothiophosphoric acid in such a manner that the temperature does not rise above 70° C. When the reaction is completed, the temperature is maintained at 60° C. for a further hour and worked up in conventional manner. 40 g. of the new ester are thus obtained in the form of a water-insoluble oil which goes over at 118° C. under a pressure of 0.01 mm. Hg.

Flies are killed completely with solutions of 0.01%. Toxicity on rats per os LD$_{50}$ 25 mg./kg.

*Example 8*

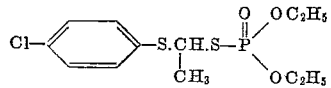

45 g. (0.25 mol) of vinyl-p-chlorophenyl thioether are dissolved in 45 millilitres of benzene. 43 g. of diethyl monothiophosphoric acid are added with stirring in such a manner that the temperature does not rise above 70° C. When the reaction is completed, the temperature is maintained at 60° C. for a further 2 hours and worked up in conventional manner. 45 g. of the new ester are obtained in the form of a colourless water-insoluble oil of B.P. 80° C./0.01 mm. Hg. Yield 53 percent of the theoretical.

Colorado beetles are killed completely with solutions of 0.1%. Spider mites are killed completely with solutions of 0.1%. Toxicity on rats per os LD$_{50}$ 10 mg./kg.

*Example 9*

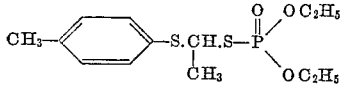

38 g. (0.25 mol) of vinyl-p-methylphenyl thioether are dissolved in 38 ml. of toluene. 43 g. of diethyl monothiophosphoric acid are added with stirring in such a manner that the temperature does not rise above 70° C. When the reaction is completed, the temperature is maintained at 60° C. for a further 2 hours and worked up in conventional manner. 46 g. of the new ester are obtained in the form of a yellow-coloured, water-insoluble oil. Yield 58 percent of the theoretical.

By the same way but using instead of vinyl-p-methylphenyl thioether the equimolecular amount of vinyl-3.4-dimethylphenyl-thioether, there is obtained the ester of the following formula

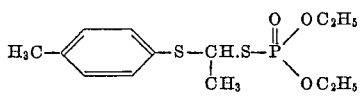

*Example 10*

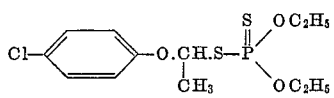

38 g. of diethyl dithiophosphoric acid are added dropwise with stirring to 32 g. (0.2 mol) of vinyl-p-chlorophenylether (B.P. 65° C./1 mm. Hg). When the reaction is completed, the temperature is maintained at 60° C. for a further 2 hours and worked up in conventional manner. 57 g. of the new ester are obtained in the form of a water-insoluble slightly yellow oil. Yield 84 percent of the theoretical.

I claim:

1. The thiophosphoric acid ester of the following formula

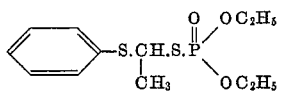

2. The thiophosphoric acid ester of the following formula

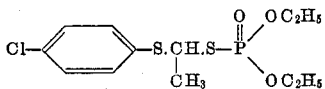

3. The thiophosphoric acid ester of the following formula

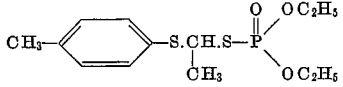

4. The thiophosphoric acid ester of the following formula

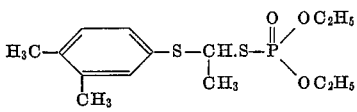

5. A thiophosphoric acid ester of the general formula

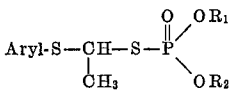

in which aryl stands for a member selected from the group consisting of phenyl, halogen-substituted phenyl and lower alkyl-substituted phenyl and $R_1$ and $R_2$ each stands for a lower alkyl radical having up to 4 carbon atoms.

References Cited in the file of this patent

UNITED STATES PATENTS

| | | |
|---|---|---|
| 2,565,920 | Hook et al. | Aug. 28, 1951 |
| 2,597,534 | Schrader | May 20, 1952 |
| 2,793,224 | Fancher | May 21, 1957 |
| 2,891,984 | Gatzi et al. | June 23, 1959 |
| 2,976,311 | Schrader | Mar. 21, 1961 |

FOREIGN PATENTS

| | | |
|---|---|---|
| 949,231 | Germany | Sept. 13, 1956 |
| 772,213 | Great Britain | Apr. 10, 1957 |
| 328,073 | Switzerland | Apr. 15, 1958 |

UNITED STATES PATENT OFFICE
CERTIFICATE OF CORRECTION

Patent No. 3,060,217                            October 23, 1962

Gerhard Schrader

It is hereby certified that error appears in the above numbered patent requiring correction and that the said Letters Patent should read as corrected below.

Column 3, line 36, for "diethiophosphoric" read -- dithiophosphoric --; column 5, lines 13 to 16, the formula should appear as shown below instead of as in the patent:

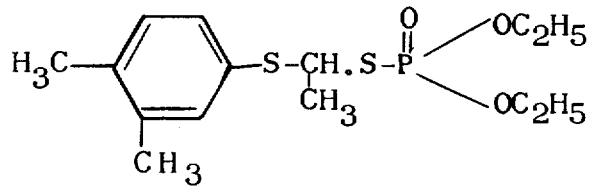

Signed and sealed this 19th day of November 1963.

(SEAL)
Attest:

ERNEST W. SWIDER                                        EDWIN L. REYNOLDS

Attesting Officer                                   Acting Commissioner of Patents